United States Patent [19]

Leiros

[11] Patent Number: 4,995,312
[45] Date of Patent: Feb. 26, 1991

[54] COOKING APPLIANCE WITH ELECTRIC HEATING

[75] Inventor: Ernest Leiros, Dijon, France

[73] Assignee: SEB S.A., Selongey, France

[21] Appl. No.: 574,529

[22] Filed: Aug. 28, 1990

Related U.S. Application Data

[63] Continuation of Ser. No. 488,504, Mar. 5, 1990, abandoned, which is a continuation of Ser. No. 191,864, May 9, 1988, abandoned.

[30] Foreign Application Priority Data

May 13, 1987 [FR] France ............................... 87 06728

[51] Int. Cl.⁵ ............................................. A47J 37/12
[52] U.S. Cl. ...................................... 99/411; 99/403; 99/413; 219/436; 219/439
[58] Field of Search ................. 99/403, 410, 411, 412, 99/413, 414–418; 126/381; 219/429, 436, 438, 439, 441

[56] References Cited

U.S. PATENT DOCUMENTS

| | | | |
|---|---|---|---|
| 2,219,949 | 10/1940 | Childs | 99/403 X |
| 2,597,695 | 5/1952 | Braski et al. | 99/411 X |
| 2,753,436 | 7/1956 | Schwaneke | 99/403 X |
| 2,863,037 | 12/1958 | Johnstone . | |
| 3,433,150 | 3/1969 | Fries | 99/403 |
| 3,463,077 | 8/1969 | Lescure | 99/403 |
| 3,577,908 | 5/1971 | Burg | 99/333 |
| 3,725,641 | 4/1973 | Tilp | 219/433 |
| 3,746,837 | 7/1973 | Frey et al. | 219/387 |
| 3,801,331 | 4/1974 | Saho et al. | 99/403 |
| 4,011,431 | 3/1977 | Levin | 99/340 X |
| 4,138,606 | 2/1979 | Brown | 219/442 |
| 4,148,250 | 4/1979 | Miki et al. | 99/403 |
| 4,189,993 | 2/1980 | Kaufman | 99/403 |
| 4,487,117 | 12/1984 | Colley et al. | 99/403 X |
| 4,560,850 | 12/1985 | Levendusky et al. | 99/DIG. 14 X |
| 4,622,230 | 11/1986 | Stone, Jr. | 99/295 X |
| 4,672,179 | 6/1987 | Onishi et al. | 99/403 X |
| 4,728,778 | 3/1988 | Choi et al. | 126/381 |

FOREIGN PATENT DOCUMENTS 2046681 3/1971 France .
2120637 8/1972 France .
290283 11/1985 Spain .

Primary Examiner—Timothy F. Simone
Attorney, Agent, or Firm—Young & Thompson

[57] ABSTRACT

A plastic skirt (3) surrounding a metal pan (1) is employed for external heat-insulation of electrically-heated cooking appliances and in particular deep fryers. The skirt (3) is of plastic material which does not continuously withstand the temperature of the pan wall (1a, 1b) and is separated from this wall by an air space (4) of sufficient width to limit the temperature of the skirt (3). The skirt is completely free with respect to the pan (1) with the exception of a ring (5) which joins the top edge (3a) of the skirt to the top edge (1c) of the pan and to which this latter is attached. The ring (5) is of heat-insulating material which affords continuous resistance to the temperature of the top edge (1c) of the pan (1).

13 Claims, 2 Drawing Sheets

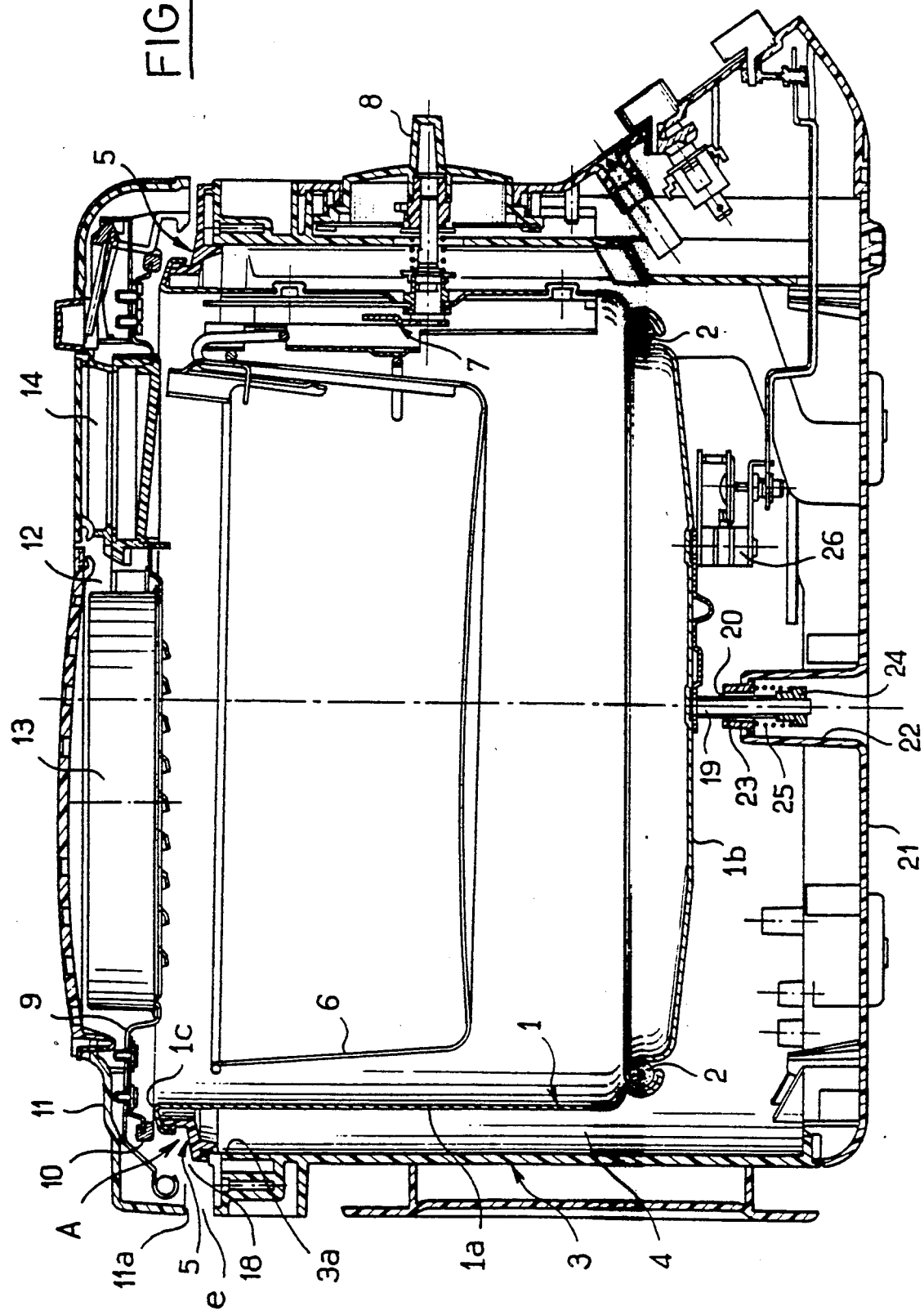
FIG_1

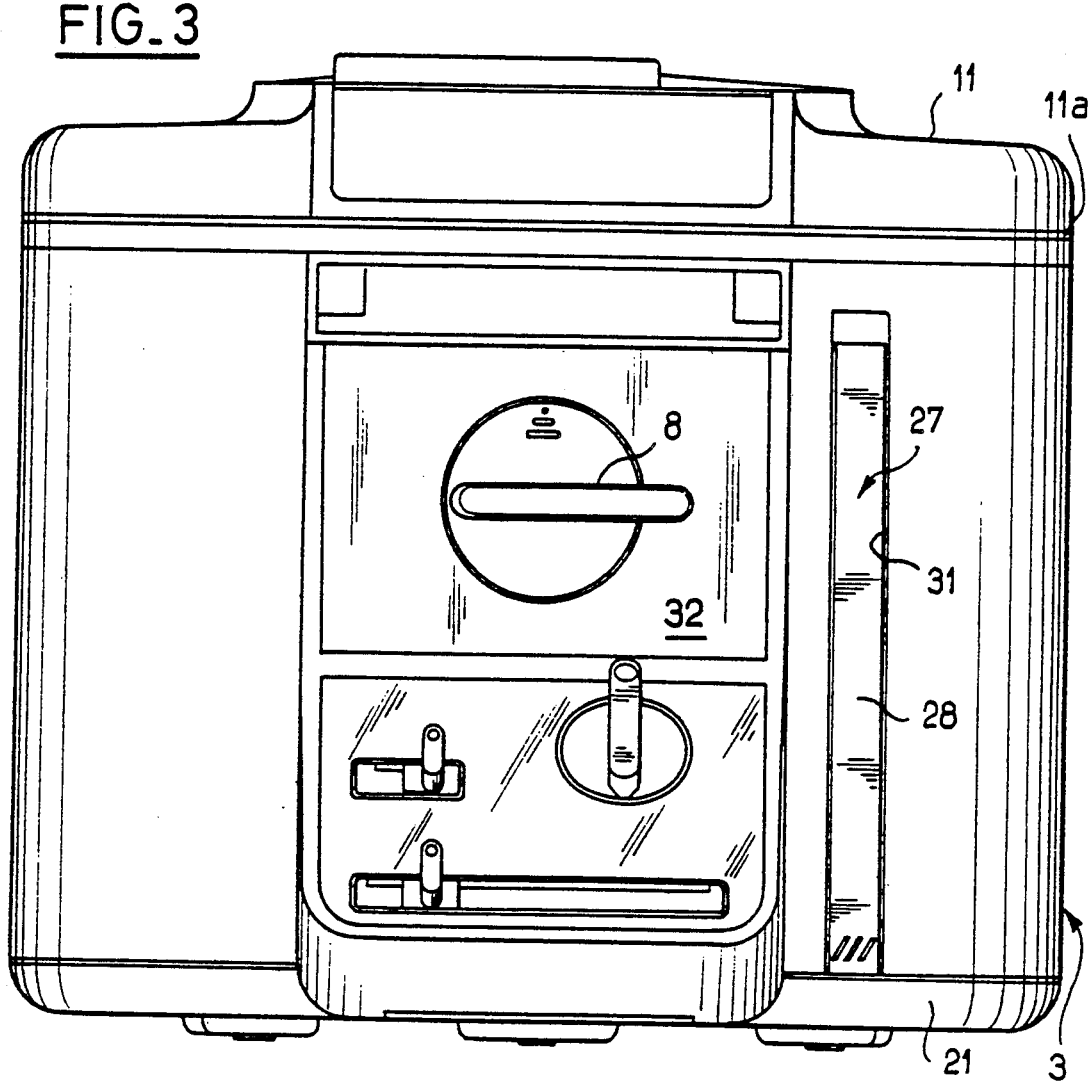
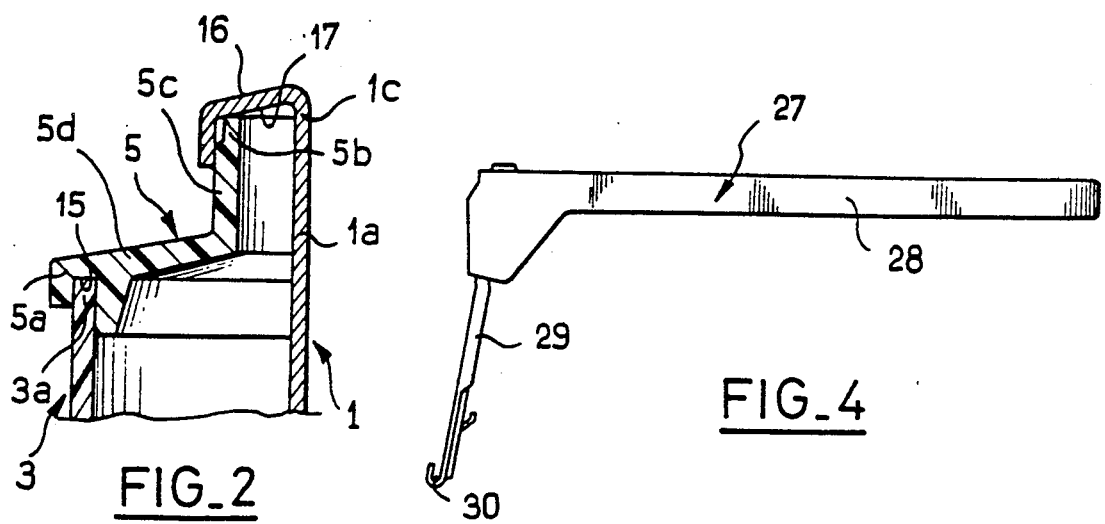

4,995,312

COOKING APPLIANCE WITH ELECTRIC HEATING

This application is a continuation, of application Ser. No. 488,504, filed Mar. 5, 1990, abandoned, which is a continuation, of application Ser. No. 191,864, filed May 9, 1988, abandoned.

BACKGROUND OF THE INVENTION

1. Field of the Invention

The present invention relates to a cooking appliance provided with a plastic skirt, a metal pan and an electric heating resistor.

The invention applies in particular to deep fryers.

2. Description of the Prior Art

In the majority of known electric fryers, the pan of metal such as aluminum is directly exposed to the surrounding air, which is attended by the following disadvantages:

- at the time of operation of the fryer, the pan easily attains a temperature equal to 150° C., with the result that users are liable to burn themselves in contact with said pan,
- in view of the fact that the pan is directly exposed to the surrounding air, heat losses are substantial, which is detrimental to thermal efficiency and consequently increases power consumption,
- the bare metal of the pan is not conducive to a particularly attractive appearance.

A few attempts have been made to overcome the disadvantages mentioned above.

In order to improve the appearance of the appliance and to reduce the external temperature, consideration has already been given to the possibility of surrounding the pan with an enameled metal skirt.

A further attempt has consisted in surrounding the pan with a plastic skirt. However, the attachment of the metal pan within the plastic skirt is such that numerous thermal bridges exist between said pan and said skirt. By reason of these numerous thermal bridges, the skirt is necessarily formed of plastic material which is capable of continuously withstanding temperatures higher than 150° C., such as the polyamides and the polyesters. These plastics have the major disadvantage of being very costly, with the result that they are incompatible with large-scale manufacture of low-priced fryers.

The object of the present invention is to produce a cooking appliance such as a low-priced deep fryer while effectively guarding users against any danger of burning and at the same time preventing heat losses to the exterior.

SUMMARY OF THE INVENTION

In accordance with the invention, the cooking appliance comprising a metal pan and an electric heating resistor, said pan being surrounded by a plastic skirt, is distinguished by the fact that said skirt is of plastic material which does not continuously withstand the temperature of the pan wall. Said skirt entirely surrounds the lateral wall and the base of the pan and is separated from these latter by an air space of sufficient width to limit the temperature of the skirt to a value which is compatible with the thermal resistance of the plastic material of the skirt. Said skirt is completely free with respect to the pan, with the exception of a ring which joins the top edge of the skirt to the top edge of the pan and to which this latter is attached, said ring being of heat-insulating material which is continuously resistant to the temperature of the top edge of the pan.

Thus the pan is attached to the interior of the skirt in such a manner as to ensure that the only contact between said skirt and said pan is located at the level of the ring. However, by reason of the fact that the ring is of heat-resistant insulating material, the skirt is not liable to be heated to an excessive temperature.

Thus the skirt can be formed of lower-grade plastic material such as polypropylene which does not continuously withstand a temperature higher than 80° C.

In view of the fact that only the ring is of noble material, the cooking appliance equipped with its outer skirt is inexpensive to produce.

Moreover, by virtue of the substantial air space located between the pan and the plastic skirt, loss of heat to the exterior is very low, thus making the cooking appliance particularly economical to use.

In addition, users are not liable to burn themselves when touching the appliance since the temperature of the skirt does not attain an excessive value. Thus the fryer can be touched at any time, either in order to move it during operation or immediately after the heating has been switched-off.

Moreover, the plastic skirt can be molded in any desired shape which is pleasing to the eye, thus making the appliance particularly attractive.

In an advantageous embodiment of the invention, the lid of the appliance is formed by a metal plate which is intended to cover the top edge of the pan in a substantially fluid-tight manner, the plate being covered by a lid of plastic material of the same nature as that of the skirt, said lid being separated from the metal plate by an air space, the connections between said plate and said lid being located solely at different points.

Thus the lid itself is maintained at a low temperature and is not liable to burn the user. Both the lid and the skirt can be made of inexpensive plastic material.

In a preferred embodiment of the invention, the ring of heat-insulating material is provided with an annular groove in the edge adjacent to the top edge of the plastic skirt. Said annular groove is engaged on the top edge of the skirt, the top edge of the pan being provided with an annular flange which is bent back so as to define a downwardly open channel which is engaged on the adjacent edge of the ring.

Thus the pan is suspended from said ring which is in turn engaged on the top edge of the skirt, thus ensuring that the pan is reliably attached within the skirt without any thermal bridge other than the very narrow contacts between the edges of the pan, of the ring and of the skirt.

BRIEF DESCRIPTION OF THE DRAWINGS

FIG. 1 is a longitudinal sectional view of a deep fryer in accordance with the invention.

FIG. 2 is a view to a larger scale showing the detail A of FIG. 1.

FIG. 3 is a view in elevation of the fryer.

FIG. 4 is a plan view of a holder for handling the frying basket of the fryer.

DETAILED DESCRIPTION OF THE INVENTION

In the embodiment of FIG. 1, the deep fryer essentially comprises an oil pan 1 of metal and an electric heating resistor 2. Said pan 1 is surrounded by a skirt 3 of plastic material such as polypropylene which does not continuously withstand the temperature of the wall of the pan 1.

Within the pan 1 is housed a frying basket 6 which can be lifted or lowered by means of a device 7 operated from the exterior by a rotatable knob 8 (as also shown in FIG. 3).

The skirt 3 completely surrounds the lateral wall 1a and the base 1b of the pan 1 and is separated from these latter by an air space 4 of sufficient width to limit the temperature of the skirt 3 to a value (for example less than 80° C.) which is compatible with the thermal resistance of the plastic material of the skirt 3. Moreover, said skirt 3 is completely free with respect to the pan 1 except for a ring 5 which joins the top edge 3a of the skirt 3 to the top edge 1c of the pan and from which this latter is suspended. Said ring 5 is of heat-insulating material which is continuously resistant to the temperature of the top edge 1c of the pan 1. By way of example, said ring 5 can be of polyamide or of polyester.

The lid of the fryer is formed by a disk-shaped metal plate 9 which covers the top edge 1c of the pan 1 in a substantially fluid-tight manner by means of an annular seal 10. Said plate 9 is covered by a lid 11 of plastic material of the same nature as that of the skirt 3. Said lid 11 is separated from the metal plate 9 by an air space 12. The connections between said plate 9 and the lid 11 are solely at different points.

Between the metal plate 9 and the lid 11 is disposed a deodorizing filter 13. In proximity to this filter 13 is located an inspection window 14 for supervision of the frying operation.

In the embodiment shown in the drawings, the ring 5 of heat-insulating material is provided (as shown in FIG. 2) with an annular groove 15 in that edge 5a of said ring which is adjacent to the top edge 3a of the plastic skirt 3, said annular groove 15 being engaged on the top edge 3a of the skirt 3.

Moreover, the top edge 1c of the pan is provided with an annular flange 16 which is bent back so as to define a downwardly-open channel 17, said channel being engaged on the adjacent edge 5b of the ring 5.

In the example illustrated, the ring 5 has a substantially L-shaped transverse cross-section, one portion 5c of the L being substantially parallel to the lateral wall 1a of the pan 1 and located in spaced relation to this latter whilst the other portion 5d extends radially towards the plastic skirt 3.

Furthermore, when the lid 11 is closed, the bottom edge 11a of this latter is separated from the top edge 3a of the skirt 3 by a gap e of sufficient width to allow the annular space 18 surrounding the ring 5 to communicate with the external air. Thus the ring 5 is cooled by the surrounding air and is not liable to be heated to an excessive temperature.

The base 1b of the pan 1 has a vertical rod 19 engaged in an opening 20 which is formed in a recess 22 of the base 21 of the outer skirt. Said opening 20 is separated from the rod 19 by a sleeve 23 of heat-insulating and heat-resistant material such as polyamide. The end of said rod 19 is fitted with a nut 24 or the like which is held tightly against a spring 25, said spring being applied against the edge of the opening 20 which is remote from the pan 1. This arrangement serves to compensate for manufacturing tolerances as well as dimensional variations caused by heat expansion.

It is also apparent from FIG. 1 that the electric heating resistor 2 is crimped within the base 1b of the pan 1 and is sufficiently remote from the base 21 and from the lateral wall of the skirt 3 to prevent any excessive heating of this latter.

A thermostat 26 is attached to the base 1b of the pan 1 and is in turn remote from the base 21 of the skirt 3 of plastic material in order to prevent any thermal bridge which would be liable to heat this plastic material to an excessive extent.

The deep fryer in accordance with the invention is provided with a holder 27 for handling the frying basket 6 (as shown in FIG. 4). Said holder 27 has a handle 28 at the end of which is fixed an arm 29 fitted with a hook 30.

As shown in FIG. 3, the skirt 3 is provided on its lateral face with a vertical slot 31 in which the basket holder 27 is flush-mounted in a detachable manner. This arrangement is made possible by the relatively substantial distance (3 to 5 cm) between the pan 1 and the zone of junction of the cylindrical portion of the skirt 3 with the flat portion 32 which surrounds the control knob 8.

The main advantages of the fryer described in the foregoing are as follows:

The outer skirt 3 of plastic material separated from the oil pan 1 makes it possible to isolate this latter and to guard the user against any danger of burning. At the same time, the air space 4 which surrounds the pan 1 considerably limits heat losses to the exterior, thus permitting a reduction in power consumption.

Moreover, in addition to the fact that the skirt 3 is practically free with respect to the pan 1 or in other words that no thermal bridge is created between the pan and the skirt, this latter can be fabricated from inexpensive ordinary-grade plastic material which does not afford resistance to high temperatures, thus permitting low-cost production of the fryer.

The only portion of the fryer which involves relatively high capital expenditure is the ring 5 which must be of noble material having good high-temperature strength. However, the incidence of said ring on the cost of the fryer is low, taking into account the small dimensions of this part.

The merit of the present invention lies in particular in the fact that, by virtue of a ring of simple design, there has been found an effective solution to the problem presented. This ring alone carries out all the following functions:

- it defines the spacing between the pan 1 and the external plastic skirt 3,
- it serves to support and to center the pan 1 within the skirt 3,
- it completely closes-off the air space between the pan 1 and the skirt 3,
- it permits free expansion of the pan 1 with respect to the skirt 3,
- it has the effect of limiting heat transfer between the pan 1 and the skirt 3.

Moreover, the outer skirt 3 of molded plastic material as well as the lid 11 formed of the same material gives the fryer an entirely new and attractive appearance. This appearance is due in particular to the fact that the control elements of the fryer as well as the basket holder 27 are remarkably integrated in the skirt as shown in FIG. 3.

As will be readily apparent, the invention is not limited to the example of construction described in the foregoing and any number of modifications may accordingly be contemplated without thereby departing from the scope or the spirit of the invention.

Thus the skirt, the lid 11 and the ring 5 can be made of plastic materials other than those given by way of example in the foregoing description.

The invention is applicable to cooking appliances other than deep fryers, such as pressure cookers with integrated electric heating, slow cookers, rice cookers, steam cookers and the like.

What is claimed is:

1. An electrical deep fryer comprising a metal pan (1) having a wall, and an electric heating resister (2) that heats said wall directly by conductive heating to a temperature higher than 150° C., said pan (1) being surrounded by a plastic skirt (3), wherein said skirt (3) is of plastic material which does not continuously withstand a temperature of 150° C., said skirt (3) entirely surrounding the lateral wall (1a) and the base (1b) of the pan and being separated from said wall and said base by an air space (4) of sufficient width to limit the temperature of the skirt (3) to a value which is compatible with the thermal resistance of the plastic material of the skirt (3), said skirt (3) being completely free with respect to the pan (1) with the exception of a ring (5) which joins only the top edge (3a) of the skirt to the top edge (1c) of the pan and to which this latter is attached, said ring (5) being of heat-insulating material which is continuously resistant to the temperature of the top edge (1c) of the pan (1).

2. An electrical deep fryer according to claim 1, the lid of the appliance being formed by a metal plate (9) which is intended to cover the top edge 91c) of the pan (1) in substantially fluid-tight manner, wherein said plate (9) is covered by a lid (11) of plastic material of the same nature as that of the skirt (3), said lid (11) being separated from the metal plate (9) by an air space (12), the connections between said plate (9) and the lid (11) being located solely at different points.

3. An electrical deep fryer according to claim 1, wherein the pan (1) is suspended from the ring (5).

4. An electrical deep fryer according to claim 1, wherein the ring (5) of heat-insulating material is provided with an annular groove (15) in the edge (5a) adjacent to the top edge (3a) of the plastic skirt (3), said annular groove (15) being engaged on the top edge 93a) of the skirt (3).

5. An electrical deep fryer according to claim 1 wherein the top edge (1c) of the pan (1) is provided with an annular flange (16) which is bent back so as to define a downwardly open channel (17) which is engaged on the adjacent edge (5b) of the ring (5).

6. An electrical deep fryer according to claim 1 wherein the ring (5) has a substantially L-shaped cross-section, one portion (5c) of said L-section being substantially parallel to the lateral wall (1a) of the pan (1) and in spaced relation thereto whilst the other portion (5d) of said L-section extends radially towards the plastic skirt (3).

7. An electrical deep fryer according to claim 2 wherein, when the lid (11) is closed, the bottom edge (11a), of said lid is separated from the top edge (3a) of the skirt by a gap (e) of sufficient width to allow the annular space (18) surrounding the ring (5) to communicate with the external air.

8. An electrical deep fryer according to claim 1 wherein the base (1b) of the pan (1) has a vertical rod (19) engaged in an opening (20) formed in the base (21) of the outer skirt (3) and separated from the rod (19) by a sleeve (23) of heat-insulating material which affords resistance to the temperature of said rod, the end of said rod (19) being fitted with a nut (24) or the like which is held tightly against a spring (25), said spring being applied against the edge of the opening (20) which is remote from the pan (1).

9. An electrical deep fryer according to claim 2, wherein the skirt (3) and the lid (11) are of polypropylene.

10. An electrical deep fryer according to claim 1 wherein the ring (5) is of polyamide or of polyester.

11. An electrical deep fryer according to claim 1 provided with a holder (27) for handling the frying basket (6), wherein the skirt (3) is provided on its lateral face with a vertical slot (31) in which the basket holder (27) is flush-mounted in a detachable manner.

12. An electrical deep fryer as claimed in claim 1, wherein said ring (5) extends over the full thickness of said air space (4) between the pan (1) and said skirt (3).

13. An electrical deep fryer according to claim 1, wherein said ring (5) completely closes the upper portion of the space (4) between said pan (1) and said skirt (3).

* * * * *

(12) EX PARTE REEXAMINATION CERTIFICATE (7385th)

United States Patent
Leiros

(10) Number: US 4,995,312 C1
(45) Certificate Issued: Mar. 2, 2010

(54) COOKING APPLIANCE WITH ELECTRIC HEATING

(75) Inventor: Ernest Leiros, Dijon (FR)

(73) Assignee: SEB S.A., Selongey (FR)

Reexamination Request:
No. 90/008,994, Jan. 18, 2008

Reexamination Certificate for:
Patent No.: 4,995,312
Issued: Feb. 26, 1991
Appl. No.: 07/574,529
Filed: Aug. 28, 1990

Related U.S. Application Data

(63) Continuation of application No. 07/488,504, filed on Mar. 5, 1990, now abandoned, which is a continuation of application No. 07/191,864, filed on May 9, 1988, now abandoned.

(30) Foreign Application Priority Data

May 13, 1987 (FR) .............................. 8706728

(51) Int. Cl.
*A47J 37/12* (2006.01)

(52) U.S. Cl. .............................. 99/411; 99/403; 99/413; 219/436; 219/439; D7/354

(58) Field of Classification Search .................... 99/403, 99/410, 411, 412, 413, 414, 415, 416, 417, 99/418
See application file for complete search history.

(56) References Cited

U.S. PATENT DOCUMENTS

| | | | | |
|---|---|---|---|---|
| 2,725,460 A | * | 11/1955 | Braski et al. ................ | 219/436 |
| 3,869,595 A | | 3/1975 | Collins et al. | |
| 4,138,606 A | * | 2/1979 | Brown ........................ | 219/442 |
| 4,142,094 A | | 2/1979 | Barradas | |
| 4,241,288 A | | 12/1980 | Aoshima et al. | |
| 4,258,695 A | * | 3/1981 | McCarton et al. ........ | 126/375.1 |
| 4,422,560 A | | 12/1983 | Solomon | |
| 4,487,117 A | * | 12/1984 | Colley et al. ................. | 99/341 |
| 4,509,412 A | | 4/1985 | Whittenburg et al. | |
| 4,617,452 A | | 10/1986 | Miwa | |

FOREIGN PATENT DOCUMENTS

| | | | |
|---|---|---|---|
| CH | 136867 | | 12/1929 |
| DE | 7044600 | | 8/1971 |
| DE | 2305992 | | 10/1973 |
| DE | 2904431 | | 8/1980 |
| EP | 0035456 | | 9/1981 |
| EP | 0162257 | | 11/1985 |
| EP | 0162482 | | 11/1985 |
| EP | 0171619 | | 2/1986 |
| ES | 290283 U | * | 4/1986 |
| FR | 2525888 | | 11/1983 |
| GB | 2105575 | | 3/1983 |
| JP | 52-132964 A | * | 11/1977 |
| JP | 59-139218 | | 8/1984 |
| JP | 60-18725 | | 8/1985 |
| JP | 58-109631 | | 8/1985 |

OTHER PUBLICATIONS

Lewis, Richard J., Sr. (2002). Hawley's Condensed Chemical Dictionary (14th Edition). John Wiley & Sons. [retrieved Feb. 14, 2002]. Retrieved online from: <http://www.knovel.com/knovel2/Toc.jsp?BookID=704&VerticalID=0>.*A (Continued)

*Primary Examiner*—Jimmy T Nguyen

(57) ABSTRACT

A plastic skirt (3) surrounding a metal pan (1) is employed for external heat-insulation of electrically-heated cooking appliances and in particular deep fryers. The skirt (3) is of plastic material which does not continuously withstand the temperature of the pan wall (1a, 1b) and is separated from this wall by an air space (4) of sufficient width to limit the temperature of the skirt (3). The skirt is completely free with respect to the pan (1) with the exception of a ring (5) which joins the top edge (3a) of the skirt to the top edge (1c) of the pan and to which the latter is attached. The ring (5) is of heat-insulating material which affords continuous resistance to the temperature of the top edge (1c) of the pan (1).

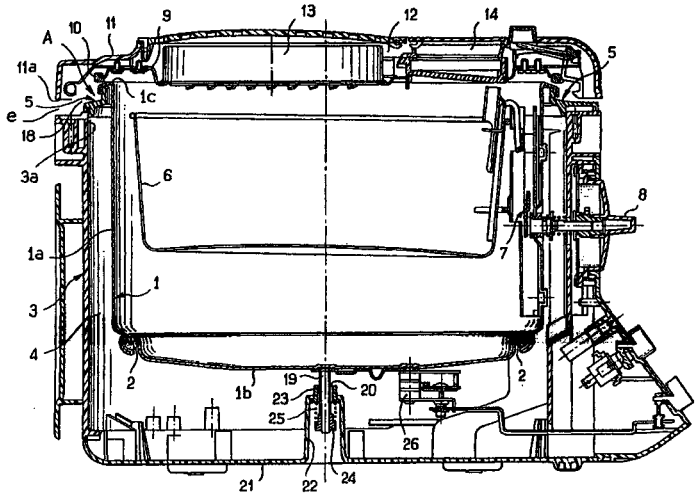

OTHER PUBLICATIONS

*SEB SA* v. *Sunbeam Corp.*, 148 Fed.Appx. 774, 2005 WL 1926418 (C.A.11(Fla.)), 9:02cv80527.*

*BSH Bosch Siemens* v. *SEB*, German Case No. 3 NI 19/99 (EU), Decision dated Jun. 27, 2000 on European Patent 0 295 159.

*SEB* v. *Pentalpha*, German Case No. 4 O 84/99, Judgment dated Dec. 16, 1999 with translation.

*SEB* v. *Moulinex*, Court Decision in France, Nov. 23, 1990 with translation.

*SEB* v. *Moulinex*, Court Decision on Appeal in France, Feb. 8, 1993 with translation.

*SEB* v. *Moulinex*, Court Decision on Appeal in France, Nov. 15, 1994 with translation.

*SEB* v. *De'Longhi*, French Case No. 01/03942, Judgment dated Oct. 19, 2004 with translation.

*SEB* v. *De'Longhi*, Court Decision on Appeal in France, Oct. 18, 2006.

*SEB* v. *De'Longhi*, Court Decision in Italy, Feb. 7, 2008.

Decision in European Patent Office with translation on European Patent No. 0295159 dated Jan. 6, 1995.

*SEB* v. *De'Longhi*, UK Case No. HC 00 004957, Approved Judgment dated Jul. 26, 2002.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *